United States Patent
Page et al.

(10) Patent No.: US 6,516,554 B1
(45) Date of Patent: Feb. 11, 2003

(54) COMBINATIONAL BOBBER AND CHUM DISPENSER

(75) Inventors: Garold Page, Orange City, FL (US); Herbert L. Harker, Jr., Winter Springs, FL (US)

(73) Assignee: Sawgrass Visions, Inc., Winter Springs, FL (US)

(*) Notice: Subject to any disclaimer, the term of this patent is extended or adjusted under 35 U.S.C. 154(b) by 0 days.

(21) Appl. No.: 09/956,859

(22) Filed: Sep. 21, 2001

(51) Int. Cl.[7] ............................................. A01K 97/02
(52) U.S. Cl. ....................................................... 43/44.99
(58) Field of Search ............................... 43/44.99, 17.2, 43/42.35, 43.14, 44.2, 44.94

(56) References Cited

U.S. PATENT DOCUMENTS

| | | | |
|---|---|---|---|
| 2,612,718 A | | 10/1952 | Steinberg |
| 2,713,744 A | * | 7/1955 | Strausser, Sr. ............. 43/44.99 |
| 2,844,907 A | | 7/1958 | Merton |
| 3,084,471 A | | 4/1963 | Alspaugh |
| D200,711 S | | 3/1965 | Ditson |
| 3,780,467 A | * | 12/1973 | Lueck ........................ 43/44.87 |
| 3,974,591 A | | 8/1976 | Ray |
| 4,602,453 A | * | 7/1986 | Polley ........................ 43/44.99 |
| 4,799,328 A | * | 1/1989 | Goldman ................... 43/42.06 |
| 4,841,664 A | | 6/1989 | Baldwin |
| 4,924,620 A | * | 5/1990 | Kimberley .................. 43/44.9 |
| 5,033,227 A | * | 7/1991 | Coxwell ..................... 43/44.99 |
| 5,107,617 A | | 4/1992 | Pendleton |
| 5,321,906 A | * | 6/1994 | Bommarito ................ 43/44.99 |
| 5,428,921 A | | 7/1995 | Lancieri |
| 5,570,532 A | * | 11/1996 | Shaffer et al. ................. 43/17 |
| 5,617,669 A | * | 4/1997 | Levey ........................ 43/44.99 |
| 5,729,928 A | * | 3/1998 | Anderson .................. 43/44.99 |
| 6,138,400 A | * | 10/2000 | Gervae ...................... 43/44.99 |

* cited by examiner

*Primary Examiner*—Charles T. Jordan
*Assistant Examiner*—Bret Hayes
(74) *Attorney, Agent, or Firm*—Julian C. Renfro, Esq.

(57) ABSTRACT

A combination bobber and chum dispenser for use in surface fishing comprising a containment member and an upper closure member secured to the containment member so as to create a lightweight hollow body designed to float adjacent the surface of the water and to be suitable for containing chum. A floatation member is disposed in the interior of the hollow body adjacent the closure member. The containment member contains a chum-receiving interior portion and has a chum distribution location involving at least one hole through which chum can be inserted into the interior portion and thereafter distributed into the water at a controlled rate. The preferred arrangement for controlling the rate at which chum can be distributed involves a rotatably mounted closure member movable between a position blocking the hole, and positions in which the hole is fully open or only partially blocked.

20 Claims, 4 Drawing Sheets

COMBINATIONAL BOBBER AND CHUM DISPENSER

FIELD OF THE INVENTION

This invention relates to a floating container for distributing marine animal matter commonly known as "chum" for the purpose of attracting fish, with this container serving the additional purpose of functioning as a bobber.

BACKGROUND OF THE INVENTION

The use of chum to attract fish to an area where fishermen have baited their hooks is well known. "Chum" is a term typically used to define various marine animal parts which are placed in fresh or salt water for the purpose of attracting fish. Chumming techniques are often used in fresh water when fishing for catfish or bream, and in salt water when endeavoring to catch a wide variety of fish as well as sharks.

Some fishermen have employed weighted bags or baskets containing chum, which are suspended in the vicinity of the fishing area. A disadvantage inherent in this procedure is that water currents may carry the less weighty baited rigs to other areas remote from the chum, thus lessening the attractive effect of the chum bag or basket. Also, the use of separate relatively large bags or baskets by individual recreational fishermen is inconvenient and uneconomical.

Several patents on chum dispensing devices of a different type have been issued, such as the Steinberg U.S. Pat. No. 2,612,718 entitled "CHUM-DISPENSING UNIT FOR FISHERMEN." This device was designed to enable an angler to manipulate a plunger provided in the device in order to convey small portions of chum as a lure to fish. However, the Steinberg device is relatively complex, involving a number of components requiring careful attention on the part of the fisherman.

The Merton U.S. Pat. No. 2,844,907 entitled "FISH CHUM DISPERSER" issued in 1958, the same year as the Steinberg patent, with the Merton device involving a part 12 adapted to contain a mixture of fish food or chum intended to disintegrate when water passes through the holes in the body 10. A spherically shaped float in the Merton device not only provides floatation, but also produces a plunking sound by striking the closure member 21 when the line is jerked, with this, according to this patentee, serving to attract fish.

The Alspaugh U.S. Pat. No. 3,084,471 entitled "FLOATING ANTI-FOULING SINKER AND CHUM DISPENSER" reveals a component in the configuration of a vertically elongated tubular body utilizing a weight W that is removable if the device is to be used as a chum dispenser.

The Ray U.S. Pat. No. 3,974,591 entitled "CHUM DISPENSING ATTACHMENT FOR FISHING RIGS" teaches a pair of half sections hinged together and able to be closed around either a float for top fishing, or a sinker for bottom fishing, with spaced perforations 16 being provided so that chum can readily dissipate from the device while preventing air bubbles from remaining inside the device. This device is obviously too complex to be marketed economically.

Pendleton U.S. Pat. No. 5,107,617 is entitled "CHUM BUOY" and illustrates a chum distributor 14 located on the lower surface of the body, with an access door 12 being provided at the top. A weight 40 is utilized to cause the chum distributor to remain properly oriented in the water, so that the flag 32 will stay in a visible position. This device is obviously not to be affixed to a fishing line.

The Lancieri U.S. Pat. No. 5,428,921 entitled "CHUM BOBBER FISHING LURE" is intended for use on a fishing line, with this patentee setting forth a sizable number of drawing figures in order to illustrate the various aspects of his complex device. This device involves an outer casing 52, with an inner casing 55 mounted for slidable movement within the outer casing, and with a spring 56 serving to regulate the relative movement of the casing members. A rubber band is utilized for covering the fill hole for the device.

All of these prior art devices are far more complex and obviously more expensive than the present invention, which on the one hand is a highly effective device, but on the other hand is of simple construction, requiring no complex moving parts and designed to be marketed quite inexpensively.

SUMMARY OF THE INVENTION

The present invention improves over the above-described devices of the prior art by providing a chum holder/dispenser and bobber which attaches directly to a baited fishing rig, so that regardless of the water current situation in a given locality, the chum device will always remain with the fishing rig for maximum efficiency of operation.

A chum dispenser and bobber for use in surface fishing in accordance with this invention comprises a containment member preferably in the form of a generally hemispherically shaped member, and a brightly colored closure member secured to the hemispherically shaped member so as to create a lightweight hollow body suitable for containing chum. A disk-shaped floatation member is disposed in the interior of the hollow body adjacent the closure member, to assure the bobber floating correctly, even when it is filled with chum. The generally hemispherically shaped containment member contains a chum distribution location, with the distribution location comprising at least one hole through which chum can be inserted, and thereafter distributed. A wire extends along the approximate centerline of the hemispherically shaped member and the closure member, with the wire protruding for a slight distance below the hemispherically shaped member to form a novel line attachment means. A closure member is rotatably mounted on the wire and disposed adjacent the chum distribution hole, with the closure member movable between a position blocking the hole, and positions in which the hole is only partially blocked or entirely open. As a result, the dispenser enables chum to be distributed at a rate determined by the positioning of the closure member.

A primary object of this invention is to provide a combination bobber and chum distribution device that is highly effective yet non-complex and able to be manufactured inexpensively.

Another object of this invention is to provide a chum distribution device that is easily refilled with chum on an as-needed basis, resulting in a quick turnaround time between uses.

Yet another object of this invention is to provide a bobber having an interior portion in which an inexpensive floatation device is provided, which floatation device provides sufficient floatation to keep the bobber within sight of the fisherman whether or not the chum supply has been depleted, but yet permits the bobber to be pulled beneath the surface of the water when a fish has been hooked.

Yet still another object of this invention is to provide a bobber involving a generally hemispherically shaped member, and a closure member secured to the hemispherically shaped member so as to create a lightweight hollow body suitable for containing chum, with a wire extending through the approximate center of the hemispherically shaped member and closure member and protruding for a slight distance beyond the hemispherically shaped member to form a highly advantageous, novel line attachment means.

A further object of this invention is to provide a bobber involving a generally hemispherically shaped member containing a chum distribution location, with this distribution location comprising at least one hole through which chum can be readily inserted and thereafter distributed, and a rotatable member disposed on the hemispherically shaped member and movable between positions in which the hole is blocked, partially open or fully open.

A yet further object of our invention is to provide a bobber having portions held together by a length of wire, with a lower portion of the wire forming an integral line attachment means providing ready adjustability of the length of line extending downwardly from the bobber to the hook.

A yet still further object of this invention is to provide a bobber involving a generally hemispherically shaped member serving with a closure member to define a lightweight hollow body suitable for containing chum, the hemispherically shaped member containing a chum distribution location from which chum can be readily inserted and thereafter distributed, and line attachment means placed with respect to the chum distribution location so as to permit the bobber to be installed at a selected location on a fishline and cast by the fisherman without any tendency for chum to be lost from the chum distribution location during the casting effort.

These and other objects, features and advantages will be more apparent as the description proceeds.

DETAILED DESCRIPTION

Figure 1:
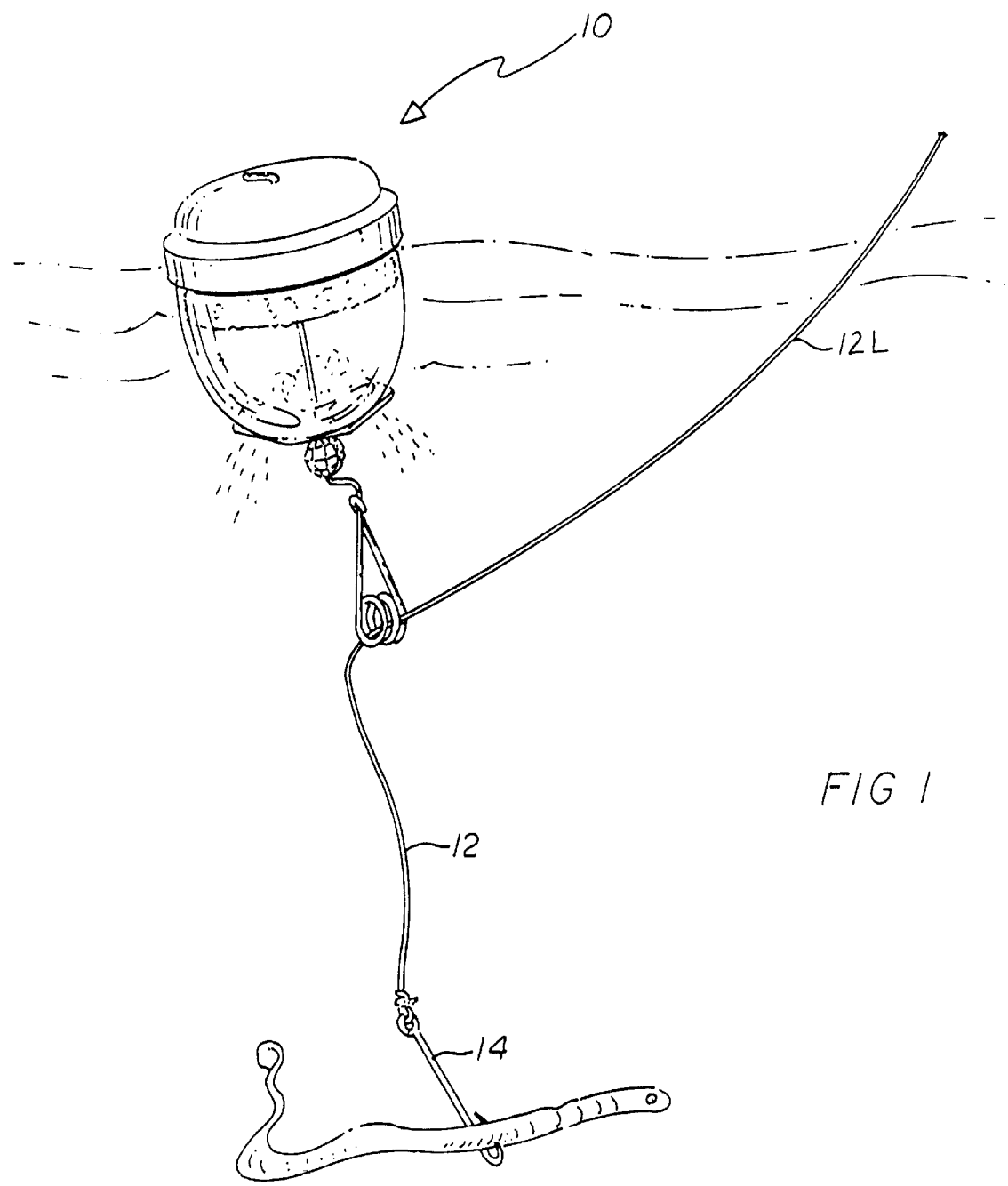
FIG. 1 is an overall view showing a typical utilization of our bobber and chum dispenser in the context of a baited hook and a line extending to a fishing pole.

With initial reference to FIG. 1 we have depicted an exemplary version of our bobber and chum dispenser 10, which in this instance is illustrated floating on the surface of a body of water, with a fishing line 12 extending downwardly from a lower portion of the bobber 10, to a baited hook 14. Also shown in this figure is the line 12L extending to the pole (not shown) held by a fisherman.

Figure 2:
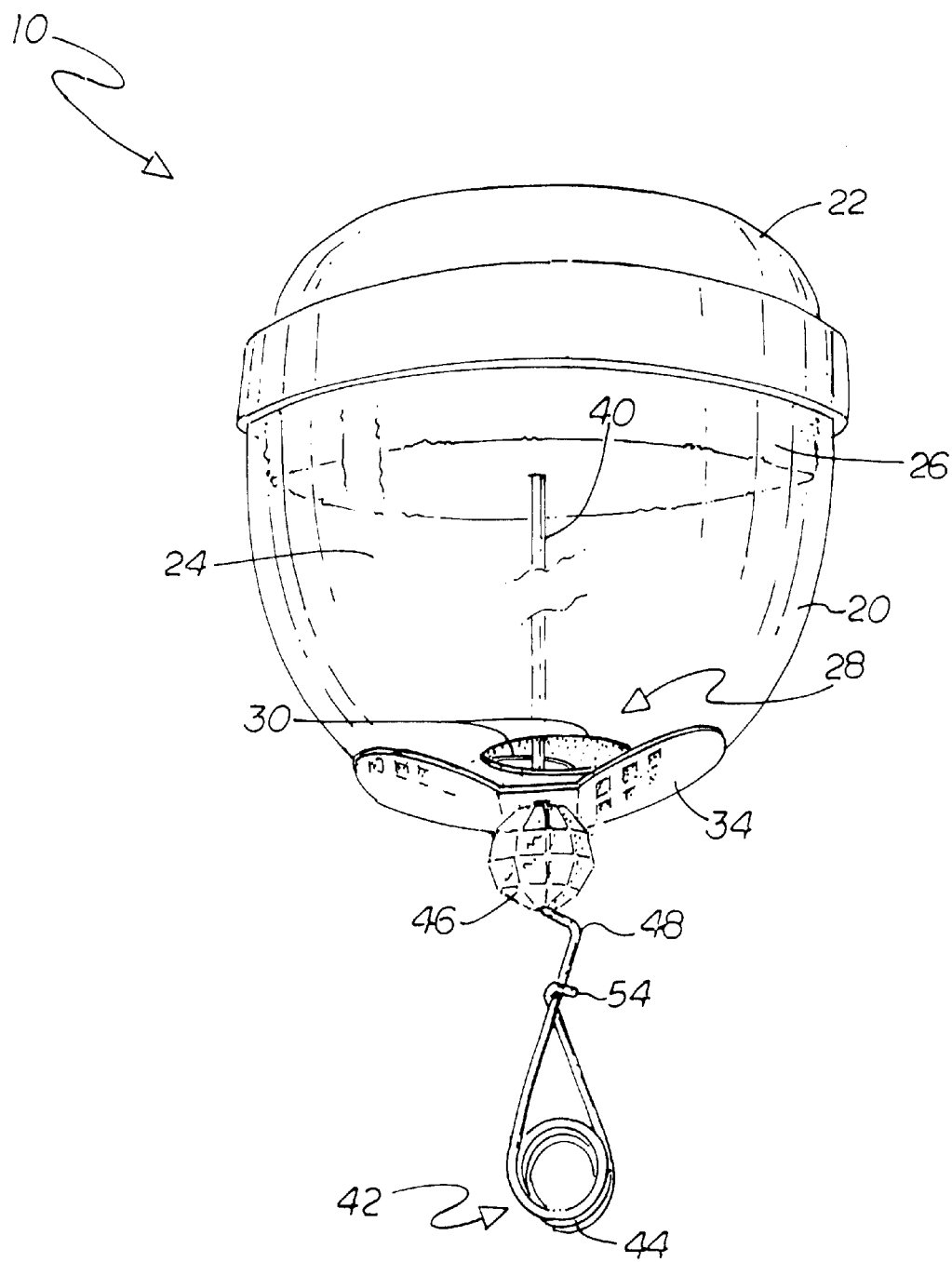
FIG. 2 is a side view of our novel bobber and chum dispenser involving a type of perspective view, revealing the use of a floatation member in the interior of the bobber, and the chum distribution location near the bottom of the device.

As seen in more detail in FIG. 2, our novel bobber and chum dispenser 10 is principally constituted by a containment member 20, which in the preferred instance is generally hemispherically shaped. An upper closure member 22 secured around of the periphery of the hemispherically shaped member, with the members 20 and 22 together defining a lightweight, hollow body. This hollow body is designed to float adjacent the surface of a body of water, with these members defining a chum-receiving interior portion 24. We prefer for the members 20 and 22 to be of lightweight plastic, with the generally hemispherically shaped member 20 transparent, but we obviously are not to be limited to this.

The upper closure member 22 is typically of a bright color, so as to be clearly visible to the fisherman. The upper closure member can be provided in a variety of colors, so as to enable a fisherman to pick a desired color for his bobbers, thus to make it readily possible for his bobbers to be distinguished from the bobbers of other fishermen fishing nearby. Because of the conspicuous coloring of the upper closure member 22, if the bobber is pulled under the surface of the water at the time a fish has been hooked, this event will be quickly apparent to the fisherman.

Figure 3A:
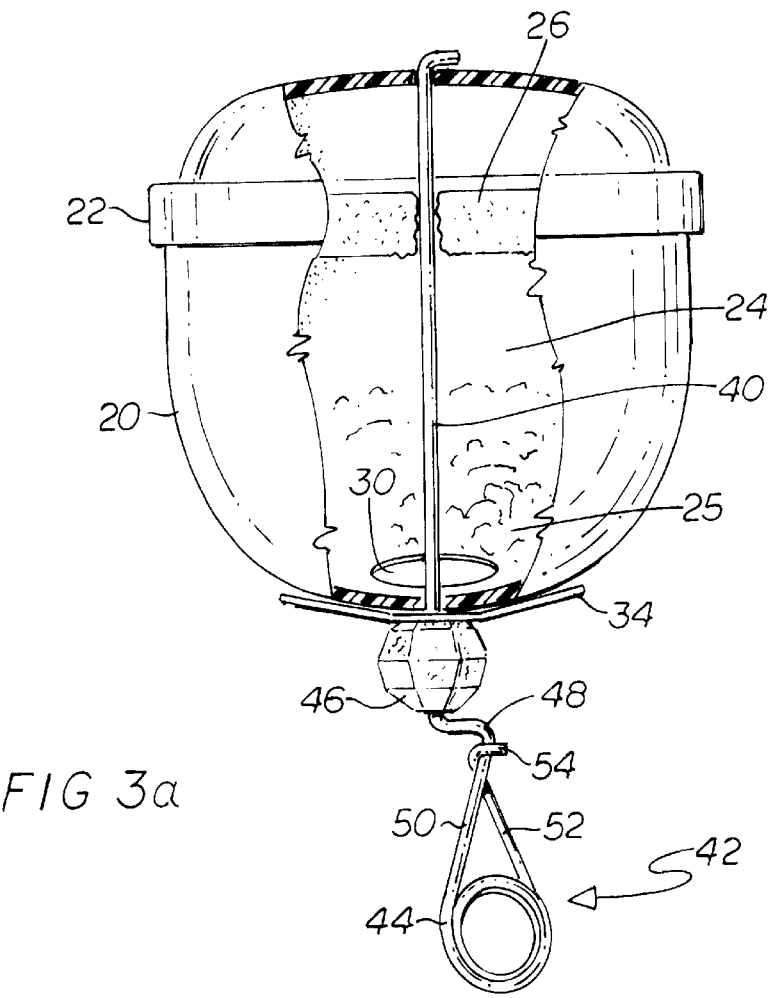
FIG. 3a is a side elevational view, partly in section to reveal the use of a simple, inexpensive floatation device located in the upper interior portion of the bobber.

For the purpose of assuring that the bobber 10 will float adjacent the surface of a body of water in a desirable position or attitude, we provide a floatation member 26 in the interior of the hollow body. As shown in FIG. 2 as well as in FIG. 3a, we prefer for the floatation member 26 to be generally disk shaped, and to reside adjacent the upper closure member 22, with the floatation member typically being of closed cell Styrofoam. We have found that a floatation member approximately 5/16" thick provides sufficient floatation for maintaining the bobber 10 floating in a desirable manner, even when filled with chum 25. In FIG. 3a we. have shown the interior of the bobber approximately half filled with chum. When the chum has been entirely dispersed, the chum receiving interior portion 24 entirely fills with water, with the floatation member 26 continuing to maintain the bobber in the approximate position illustrated in FIG. 1. However, the hooking of a sizable fish will overcome the buoyancy provided by the floatation member, and permit, as a signal to the fisherman, the bobber to be drawn below the surface of the water.

At a location on the generally hemispherically shaped member 20 remote from the upper closure member 22 is chum distribution location 28. The chum distribution location comprises at least one hole 30 through which chum can be readily inserted, and it is through this same hole that the chum is thereafter distributed during the fishing effort. However, in the preferred instance we use, as illustrated in FIG. 2, a pair of holes 30 to enable the speedy refilling of the bobber with chum each time the chum supply has become depleted, when refilling becomes necessary. A dispensing means including the use of a pair of holes is also helpful in establishing some circulation through the bobber's interior portion 24 when the fisherman tugs or jerks on his line. The hole or holes 30 are preferably placed at diametrically opposed locations (note FIGS. 4a–4c) and can be approximately ½" in diameter, although we obviously are not to be limited to this.

A dispensing means principally involving the use of a rotatable closure member 34 is mounted adjacent the chum distribution location 28, with the member 34 forming means for controlling the rate of chum distribution. The rotatable closure member enables the hole or holes 30 to be maintained fully open, partially closed, or fully closed positions, depending on the nature and consistency of the chum. We prefer for the rotatable member to be of open weave or mesh construction. When mesh construction is utilized, the rotatable closure member 34 advantageously permits the oils associated with certain types of chum to exude into the water, even when the closure member 34 has been positioned so as to occlude the hole or holes 30.

As seen in FIGS. 2 and 3a, a wire 40 extends through the approximate centerline of the hemispherically shaped member 20 and the upper closure member 22. The upper end of the wire is attached, such as by a bent-over portion, to the upper closure member, whereas the lower end of the wire 40 protrudes for a slight distance below the generally hemispherically shaped member 20 to form a novel line attachment means 42. The wire we utilize is stiff stainless steel wire that will retain the configuration in which it has been bent.

The aforementioned rotatable closure member 34 is mounted on the wire 40 in such a position as to reside closely adjacent the lower surface of the generally hemispherically shaped member 20 and the hole or holes 30. Typically the member 34 possesses a bit of curvature so as to conform to the configuration of the lowermost portion of the generally hemispherically shaped member 20. It is important to note that the closure member 34 is readily movable by the user between the position depicted in FIG. 4a, in which the holes 30 are entirely open, as well as to a position depicted in FIG. 4b in which the holes are only partially blocked. In FIG. 4c we show the rotatable closure member 34 having been moved to a position extending completely over the holes 30, with it to be understood that even in this circumstance, the open weave (mesh) construction preferably utilized in conjunction with the rotatable closure member 34 permits oils and other essence from the chum to be distributed into the water to serve as an attractant for fish.

We assure the rotatable closure member being maintained in an operative position closely adjacent the chum distribution hole or holes 30 by the use of a colored bead 46, which is held in a desired position by a shoulder-forming bend 48 in the wire 40; note FIGS. 2 and 3a. The colored bead 46 is of a commercially available type, with the bead having a number of facets thereon serving to refract sunlight in a manner certain fish find to be attractive.

Figure 3B:
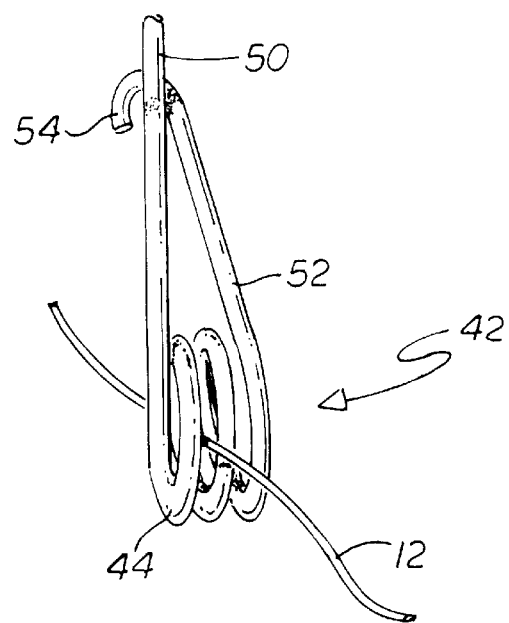
FIG. 3b is a view, to a somewhat larger scale, of the novel line attachment arrangement we utilize on a lower portion of our bobber.

It is to be noted that our novel line attachment means 42 is created by forming several turns or loops 44 in the wire, such as three or four in number, with these turns or loops residing closely together; note FIG. 3b. Because, as previously mentioned, we utilize stainless steel wire that is quite stiff, the turns or loops 44 reside tightly together, and form a means for tightly retaining the fishing line 12 in a desired relationship to the bobber, in the manner depicted in FIG. 1 and FIG. 3b.

We utilize a wire 40, preferably a single length of wire, in the creation of our novel bobber and the line attachment means 42, with it being the lower portion 50 of the wire 40 that is tightly bent to form the turns or loops 44; note FIGS. 3a and 3b. The final portion 52 of the wire residing beyond the turns or loops 44 and then extending upwardly above the loops 44 is to be hooked to the wire portion 50 residing above the loops. To make this readily possible, we create a small hook portion 54 in the very end of the portion 52.

At the time of the installation of our novel bobber to the fishing line, the fisherman moves the small hook portion 54 away from the wire portion 50, then inserts the fishing line down between selected loops 44 of the line attachment means 42. He thereafter causes the hook portion 54 to be reattached to the wire portion 50 above the loops 44, so that the line cannot become accidentally separated from the line attachment means 42.

It is to be noted that if a fisherman wishes to have the line 12 extending down to the hook 14 to be of a length different than that depicted in FIG. 1, he needs only to hold the bobber in one hand, and then with his other hand pull on the line 12L so as to change its position with respect to the hook 14 to one that is more suitable in a given instance. This readjustment of length, involving the fishing line sliding with respect to an adjacent pair of loops 44, can be accomplished very rapidly, and is far more advantageous than previous methods.

With regard to the types of chum, some fishermen prefer the use of chicken livers or bacon, the oils from which are attractive to certain types of fish. In this event the rotatable closure member 34, after the filling of the bobber, would be moved to the position depicted in FIG. 4c in which the mesh member is positioned in the hole-occluding position.

On the other hand, when the chum takes the form of cat food, dog food or the like, the rotatable closure member would be positioned either in the half open or fully open position, to obtain a desirably large amount of food particles flowing out of the device.

Figure 4A:
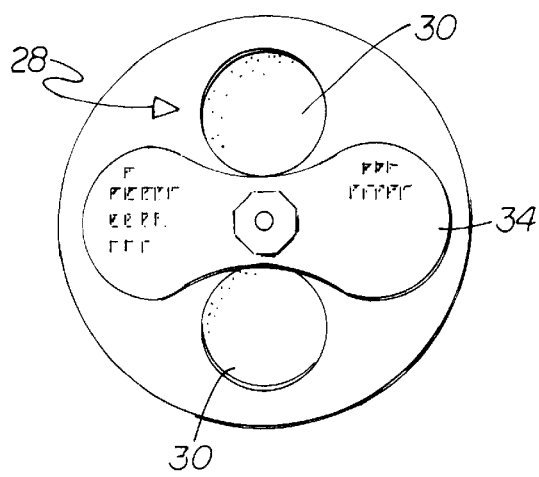
FIGS. 4a, 4b and 4c illustrate different operative positions of the rotatably mounted closure member we use adjacent the chum distribution location, for establishing the rate at which chum is distributed into the water.
Figure 4B:
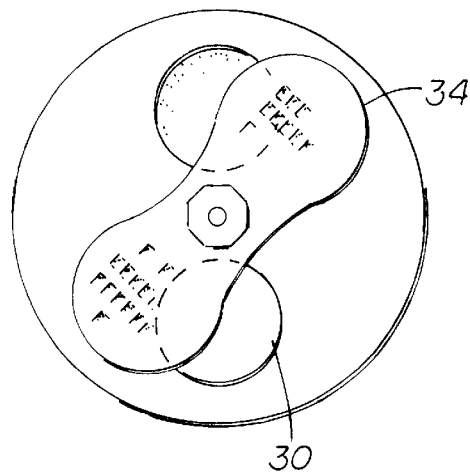
Figure 4C:
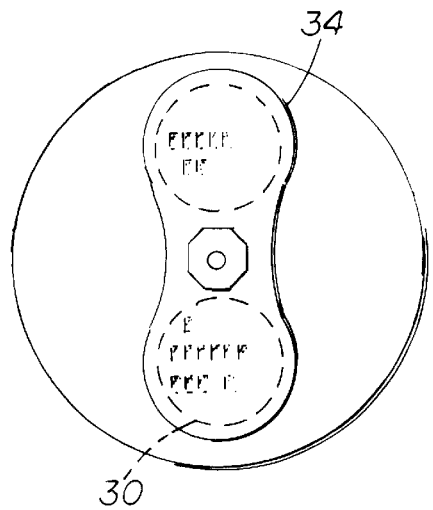

Although we are not limited to the use of a pair of holes 30, the use of two holes residing in the diametrically opposed relationship depicted in FIGS. 4a–4c is desirable in that during the filling of the interior portion 24 with chum, air previously existing in the interior portion can be displaced through one hole as filling takes place through the other hole. We have found that if chum is placed in a "squeeze bag" in the nature of a cake decorating bag of plastic or the like, the chum can be extruded into one of the holes 30 at a relatively rapid rate, so that the turnaround time involved in refilling the bobber is minimized.

In the event a rod and reel is being used, and the fisherman wishes to cast, it is to be observed that our bobber will be supported from the line attachment means 42 in what may be regarded as an inverted position, in which the chum is residing in the interior cavity 24 closely against the disc-shaped floatation member 26. Because of this, it is highly unlikely that chum will be lost during the casting effort inasmuch as at this time the chum is in effect forced away from the holes 30. However, when the bobber strikes the water, it will immediately resume the position shown in FIGS. 1 and 2, in which the chum distribution location 28 is in a lower portion of the bobber, and the floatation means is at the top.

Our bobber is not to be limited to use with rod and reel, for if a cane pole is being utilized, the bobber and hook combination can be readily dropped or flung into the water.

For use in connection with fresh water fishing, our bobber can have an upper closure member measuring approximately two inches across, and a height slightly more than two inches. For salt water fishing, our novel device can be substantially larger than this.

We claim:

1. A chum dispenser for use in surface fishing comprising a containment member, and an upper closure member secured to said containment member so as to create a lightweight hollow body designed to float adjacent the surface of the water and to be suitable for containing chum, a floatation member disposed in the interior of said hollow body adjacent said closure member, said containment member containing a chum-receiving interior portion and having a chum distribution location, said chum distribution location involving at least one hole through which chum can be inserted into said interior portion, and thereafter distributed, and means for controlling the rate at which chum can be distributed into the water from said interior portion.

2. The chum dispenser for use in surface fishing as defined in claim 1 in which said containment member is generally hemispherically shaped.

3. The chum dispenser for use in surface fishing as defined in claim 1 in which said means for controlling the rate at which chum can be distributed is a rotatably mounted closure member disposed adjacent said hole and movable between a position blocking said hole, and positions in which said hole is fully open or only partially blocked, said rotatably mounted closure member enabling chum to be distributed into the water at a rate determined by the positioning of said rotatably mounted closure member.

4. The chum dispenser for use in surface fishing as defined in claim 3 wherein said rotatably mounted closure member is of mesh construction.

5. The chum dispenser for use in surface fishing as defined in claim 1 wherein said chum distribution location involves a pair of holes, adjacent which a rotatable closure member is disposed, said rotatable closure member being configured to enable both holes either to be closed, or opened to an approximately equal extent.

6. The chum dispenser for use in surface fishing as defined in claim 1 wherein said floatation member disposed in the interior of said hollow body is generally disk-shaped.

7. The chum dispenser for use in surface fishing as defined in claim 6 wherein said disk-shaped floatation member is made of Styrofoam, with said disk providing sufficient buoyancy as to hold said upper closure member slightly above the surface of the water, whether the hollow body is filled with chum or with water.

8. The chum dispenser for use in surface fishing as defined in claim 1 wherein said containment member and said upper closure member are secured together by a wire, with a lower portion of said wire forming a line attachment means, said line attachment means involving a plurality of turns of wire extending below said containment member, said turns of wire being tightly wound and forming a clip for tightly holding a fishing line inserted between two adjacent turns.

9. A chum dispenser for use in surface fishing comprising a generally hemispherically shaped member, and an upper closure member secured to said generally hemispherically shaped member so as to create a lightweight hollow body designed to float adjacent the surface of the water and to be suitable for containing chum, a floatation member disposed in the interior of said hollow body adjacent said closure member, said generally hemispherically shaped member containing a chum-receiving interior portion and having a chum distribution location involving at least one hole through which chum can be inserted into said interior portion, and thereafter distributed, and a closure member operatively mounted adjacent said hole and selectively movable to positions controlling the rate of chum distribution.

10. The chum dispenser for use in surface fishing as defined in claim 9 in which said closure member is rotatable and movable between a position blocking said hole, and positions in which said hole is fully open or only partially blocked, said rotatable closure member enabling chum to be distributed into the water at a rate determined by the positioning of said rotatable closure member.

11. The chum dispenser for use in surface fishing as defined in claim 10 in which said rotatable closure member is of mesh construction.

12. The chum dispenser for use in surface fishing as defined in claim 9 wherein said chum distribution location involves a pair of holes, and said closure member is configured to enable both holes either to be closed, or opened to an approximately equal extent.

13. The chum dispenser for use in surface fishing as defined in claim 9 wherein said floatation member disposed in the interior of said hollow body is generally disk-shaped.

14. The chum dispenser for use in surface fishing as defined in claim 9 wherein said floatation member is made of Styrofoam, with said floatation member providing sufficient buoyancy as to hold said upper closure member slightly above the surface of the water, whether the hollow body is filled with chum or with water.

15. The chum dispenser for use in surface fishing as defined in claim 9 wherein said generally hemispherically shaped member and said upper closure member are secured together by a wire, with a lower portion of said wire forming a line attachment means, said line attachment means involving a plurality of turns of wire extending below said generally hemispherically shaped member, said turns of wire being tightly wound and forming a clip for tightly holding a fishing line inserted between two adjacent turns.

16. A chum dispenser for use in surface fishing comprising a generally hemispherically shaped member, and an upper closure member secured to said generally hemispherically shaped member so as to create a lightweight hollow body designed to float adjacent the surface of the water, a floatation member disposed in the interior of said hollow body adjacent said closure member, said generally hemispherically shaped member containing a chum-receiving interior portion as well as a chum distribution location, said distribution location comprising at least one hole through which chum can be inserted and thereafter distributed, a wire extending through the approximate center of said generally hemispherically shaped member and said upper closure member, with said wire protruding for a slight distance beyond said generally hemispherically shaped member to form a line attachment means, a rotatable closure member mounted on said wire and disposed adjacent said hole, said rotatable closure member forming a dispensing means and being movable between a position blocking said hole, and positions in which said hole is only partially blocked or entirely open, said dispensing means enabling chum to be distributed at a selected rate.

17. The chum dispenser for use in surface fishing as defined in claim 16 wherein said rotatable closure member is of mesh construction.

18. The chum dispenser for use in surface fishing as defined in claim 16 wherein said chum distribution location involves a pair of holes, and said rotatable closure member is configured to enable both holes either to be closed, or opened to an approximately equal extent.

19. The chum dispenser for use in surface fishing as defined in claim 16 wherein said floatation member disposed in the interior of said hollow body is made of Styrofoam, with said Styrofoam member providing sufficient buoyancy as to hold said upper closure member slightly above the surface of the water, whether the hollow body is filled with chum or with water.

20. The chum dispenser for use in surface fishing as defined in claim 16 wherein said line attachment means involves a plurality of turns of the wire extending beyond said generally hemispherically shaped member, said turns of wire being tightly wound and forming a clip for tightly holding a fishing line inserted between two adjacent turns.

* * * * *